(12) United States Patent
Kozyuk

(10) Patent No.: US 10,159,915 B2
(45) Date of Patent: Dec. 25, 2018

(54) DEVICE AND METHOD FOR DEGASSING LIQUIDS

(71) Applicant: Arisdyne Systems, Inc., Cleveland, OH (US)

(72) Inventor: Oleg Kozyuk, North Ridgeville, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 202 days.

(21) Appl. No.: 15/065,093

(22) Filed: Mar. 9, 2016

(65) Prior Publication Data

US 2016/0279538 A1    Sep. 29, 2016

Related U.S. Application Data

(60) Provisional application No. 62/137,454, filed on Mar. 24, 2015.

(51) Int. Cl.
    *B01D 19/00* (2006.01)
(52) U.S. Cl.
    CPC ..... *B01D 19/0094* (2013.01); *B01D 19/0042* (2013.01)
(58) Field of Classification Search
    CPC ...................................... B01D 19/00–19/0495
    USPC .............................. 96/155–220; 95/241–266
    See application file for complete search history.

(56) References Cited

U.S. PATENT DOCUMENTS

| 2,094,778 A | 12/1899 | Alexander |
| 4,100,071 A | 7/1978 | Beurer et al. |
| 4,261,521 A | 4/1981 | Ashbrook |
| 5,064,449 A | 11/1991 | Ford et al. |
| 5,091,118 A | 2/1992 | Burgher |
| 5,435,913 A | 7/1995 | Ashbrook |
| 5,749,945 A | 5/1998 | Beck |
| 6,649,059 B2 | 11/2003 | Romanyszyn et al. |
| 7,651,621 B2 | 1/2010 | Kelsey et al. |

(Continued)

FOREIGN PATENT DOCUMENTS

| JP | 2013-63374 A | 4/2013 |
| WO | 2007/020296 A1 | 2/2007 |

OTHER PUBLICATIONS

The Supplementary European Search Report issued in corresponding European Patent Application No. 16769304.3; dated Sep. 14, 2018.

*Primary Examiner* — T. Bennett McKenzie
(74) *Attorney, Agent, or Firm* — Pearne & Gordon LLP

(57) ABSTRACT

Devices for the removal of gases and/or volatilizable contaminants from liquids are described. In one example device, a liquid fluid containing dissolved gases and/or volatilizable contaminants are passed through at least one local constriction in a flow-through chamber at a sufficient pressure and flow rate to create cavitation bubbles in the liquid flow. The dissolved gases and/or volatilizable contaminants migrate into the cavitation bubbles. The velocity of the liquid flow is then reduced, which allows for the cavitation bubbles in the liquid flow to coalesce. The velocity of the liquid flow can then be reduced further, resulting in additional coalescing of the cavitation bubbles. The cavitation bubbles that contain the gases and/or volatilizable contaminants can then be separated from the liquid flow. The separation generally leaves a liquid flow product that may have a concentration of one or more gases or volatilizable contaminants lower than the starting liquid flow.

12 Claims, 2 Drawing Sheets

(56) References Cited

U.S. PATENT DOCUMENTS

| | | |
|---|---|---|
| 2003/0111429 A1 | 6/2003 | Montalvao et al. |
| 2004/0251566 A1 | 12/2004 | Kozyuk |
| 2005/0077636 A1 | 4/2005 | Bortkevitch |
| 2016/0250604 A1* | 9/2016 | Takahashi ............ B01F 5/0659 261/21 |

* cited by examiner

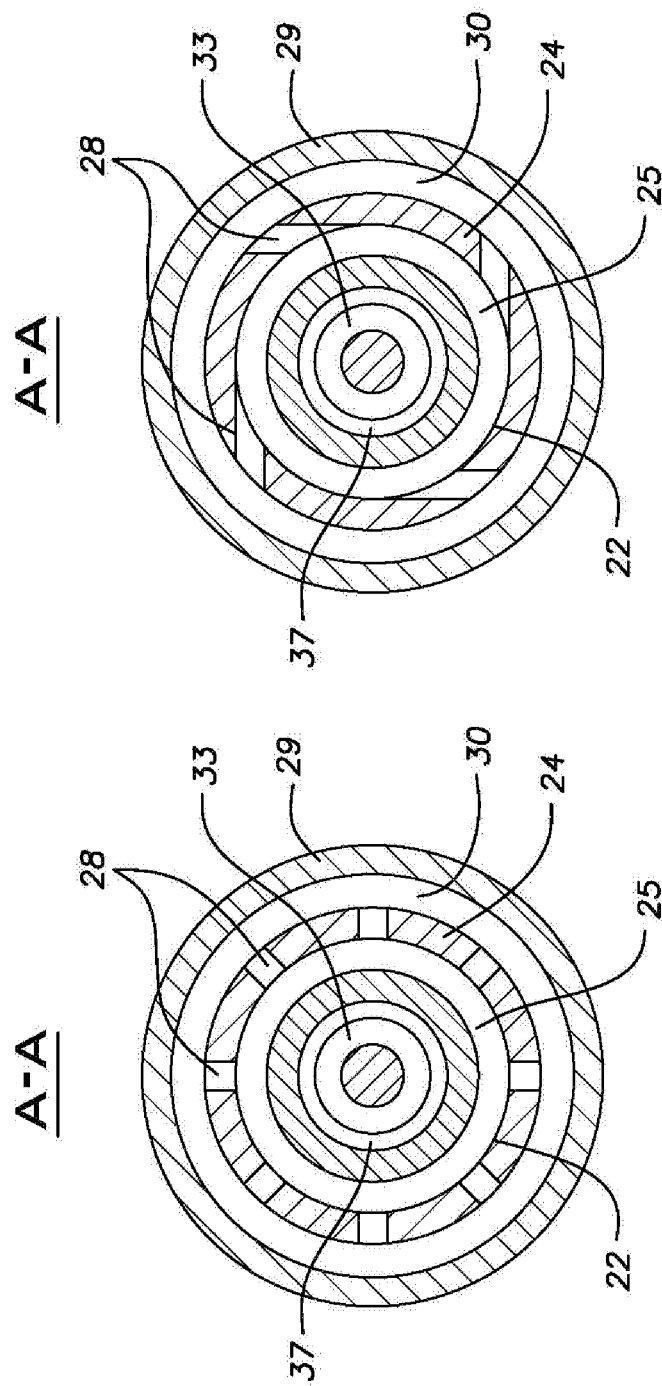

DEVICE AND METHOD FOR DEGASSING LIQUIDS

FIELD OF THE INVENTION

The following description relates generally to methods and devices for the removal of gases and volatilizable contaminants from liquids.

BACKGROUND OF THE INVENTION

Many industries have the need to remove dissolved gases in liquids, for example, to protect a downstream process or piece of equipment.

Oxygen, carbon dioxide, reactive gas, and other gases dissolved in water, solutions, or other liquids can adversely affect many processes. For instance, in the industrial, pharmaceutical, or semiconductor industry, delivering water having low levels of dissolved gases leads to longer equipment life, reduced maintenance, and improved process quality.

Degasifying a liquid can be achieved by using devices such as:
- open-air heated tanks for partial removal of dissolved gas;
- systems for holding a contaminated liquid under a partial vacuum;
- scrubbers, wherein a liquid contaminated with undesired gases are sprayed to form drops or spread on high-surface area configurations;
- employing a membrane of separation cells;
- exposing the liquids to ultrasonic waves; and
- inducing hydrodynamic cavitation in the liquid, while maintaining a negative pressure within the volume in which the liquid is confined.

U.S. Pat. No. 5,064,449 describes a method of degassing a fluid flow which includes locating a vortex valve having a vortex chamber with radial inlet, axial outlet, and tangential control ports in the fluid-flow line, regulating the pressure drop across the vortex chamber to cause cavitation with the release of dissolved gases in the flow at the outlet and removing the gases from the fluid flow.

U.S. Pat. No. 5,749,945 describes inline gas-dissolution devices that use cavitating venturi for removing microbubbles of dissolved gases from liquid.

Other patents such as U.S. Pat. Nos. 4,261,521, 5,435,913, 6,649,059, and 7,651,621 disclose a vortex-nozzle assembly constructed with a pair of vortex nozzles positioned within a housing in an opposed relationship. As fluid is forced spirally out of each vortex tube, centrifugal energy flattens a circular section of fluid against the side of the tapered vortex tube. This action accelerates the fluid as it spirals out toward the exit, creating a void inside the vortex tube chamber. When the fluid exits the walls of the vortex tube, it accelerates radially forming a hollow fluid cone. The hollow fluid cone from one vortex nozzle impacts with the hollow fluid cone from the other vortex nozzle inside the housing, which forms a liquid lined, closed chamber. This closed chamber develops a substantial cavitation vacuum due to the void caused by the centrifugal energy of the vortex. The energy from the impact of the two hollow fluid cones in the presence of this substantial vacuum effects changes to the fluid.

WO2007/020296 discloses a hydrodynamic cavitation degasifier, particularly a deaerator, which creates a degasifier as well as a degasifying method using the components known from cavitation mixers.

Other types of cavitation methods and devices for deaeration can be used such as the apparatus disclosed in U.S. Patent Publication No. 2003/0111429.

Although all of these devices have benefits, there are numerous problems remaining in the development of a reliable device for the removal of gases from liquids in a continuous mode.

SUMMARY OF THE INVENTION

The present invention is directed to a process for removing dissolved gases, for example entrained gases otherwise present in the liquid, and volatile contaminants from a liquid. This is accomplished by forcing the contaminated liquid stream through a cavitating device designed to not only free the dissolved air or other gases and evaporate volatile contaminants, but then to coalesce a sizeable fraction of the gas released, typically very small bubbles, to larger bubbles. The small bubbles are difficult to separate or break because their buoyancy is minimal compared with their resistance to rising under gravity.

A further aspect of the present invention is to not only remove or free dissolved gases from the liquids but also to coalesce the bubbles in the main stream carrying the small bubbles by flowing the liquid with a constantly decreasing velocity through one or more changes in direction or turns of tubing following the initial processing through the cavitating device. A device for degassing a liquid is provided.

BRIEF DESCRIPTION OF THE DRAWINGS

FIG. 2A is a cross-sectional view taken along line A-A of the device 10 illustrated in FIG. 1, according a first embodiment.

FIG. 2B is a cross-sectional view taken along line A-A of the device 10 illustrated in FIG. 1, according to a second embodiment.

DETAILED DESCRIPTION OF PREFERRED EMBODIMENTS

Figure 1:
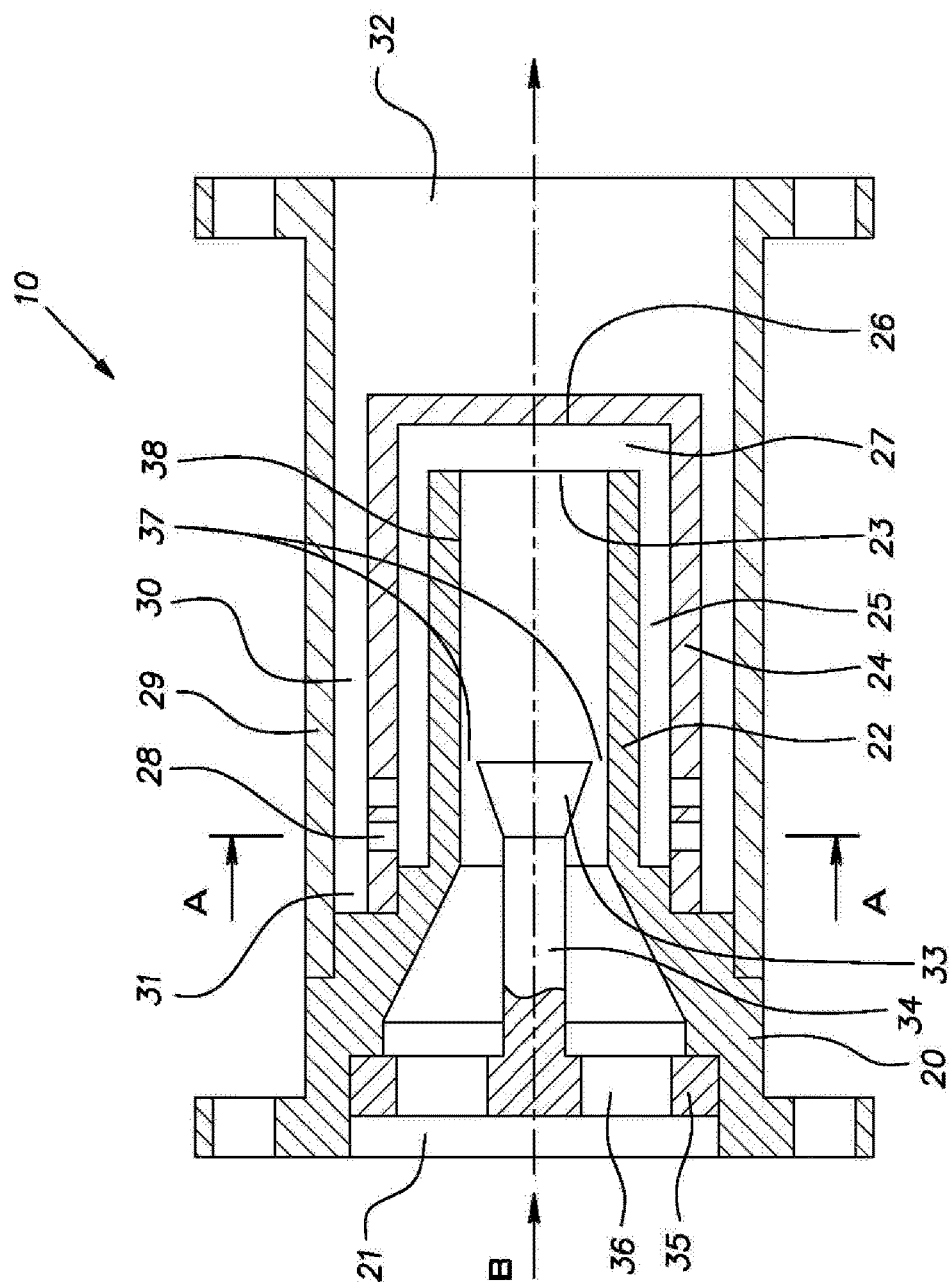
FIG. 1 is a longitudinal cross-sectional view of a device 10 for degassing liquids, according to a first embodiment.

In the description that follows, when a preferred range, such as 5 to 25 (or 5-25) is given, this means preferably at least 5 and, separately and independently, preferably not more than 25.

Various liquid streams require degassing to protect a downstream process or piece of equipment. Analytical equipment and drug-delivery systems require degassing as bubbles or entrained gas can interfere with the sensitive flow or analytical detection systems. Aqueous systems may require purification by removal of volatile organic compounds or removal of dissolved gases either to generate potable water or to purify the water for subsequent processing use. The semi-conductor industry employs significant numbers of degassing systems for its ultra-pure water systems. Bubbles present during chip and wafer manufacture result in costly defects. Beverages are degassed to pull out $CO_2$ and replace it with $N_2$. Ink-jet printers would benefit from degassing by allowing higher print speeds. Boiler systems require degassing the water to avoid pitting and corrosive action from heated dissolved gases, especially $CO_2$. Degassing some of the $CO_2$ and other dissolved gases from water for cooling towers and evaporative condensers can allow the formation of precipitation of calcium carbonate and prevent scale, deposition, and microbiological fouling on heat-exchange surfaces.

Apparatus and processes for degassing liquids are described herein. The apparatus and processes relate to subjecting a gas-saturated or gas-containing liquid flow to cavitation, wherein the dissolved or entrained gas migrates into the cavitation bubbles. The liquid flow can then be separated from the gas-containing cavitation bubbles. Hydrodynamic cavitation may include producing cavitation bubbles in the mixture by creating low pressure areas in the liquid flow. The processes and apparatus disclosed herein generally produce fluids containing a reduced amount of gases and volatilizable contaminants.

Producing cavitation bubbles in a fluid by hydrodynamic cavitation may occur in a variety of ways. In one example, a fluid is flowed through one or more locally-constricted areas. Flowing the fluid through the locally-constricted areas, under certain conditions (e.g., fluid pressure, flow rate, velocity, and size of local constriction), may produce a localized pressure drop in the fluid. In one example, if the local pressure of a fluid decreases below its boiling point, vapor-filled cavities and bubbles may form (e.g., cavitation bubbles). In one example, a fluid containing gases and volatilizable contaminants and optional other substances, is flowed through locally-constricted areas multiple times. The fluid may also be flowed through zones of elevated pressure multiple times. For example, multiple locally-constricted areas and/or zones of elevated pressure may be in fluid communication with one another so that they are in series.

The fluids containing gases and volatilizable contaminants that may be degassed may be of a variety of types. For example, the fluids may be aqueous-based solutions.

As shown in FIG. 1, a device for degassing liquids 10 comprises a housing 20 having an inlet 21 configured to introduce a liquid flow or fluid into the device 10 along a general axis represented by arrow B through a first tubular section 22 and an outlet 23 configured to permit the fluid to exit the device 10. Generally, cavitation chambers are configured to produce hydrodynamic cavitation in a fluid flowing therethrough. In one design, a cavitation chamber produces one or more local areas of low pressure in a fluid flowing therethrough. The local areas of low pressure generally produce cavitation bubbles in the fluid. Exemplary device 10 includes a baffle-type design that produces the local area of low pressure in the fluid. For example, in the baffle-type design illustrated in FIG. 1, the local constriction of flow includes an orifice 37 defined between the baffle body 33 and an inner wall of a first tubular section 22. In one example, the size of the gap between the baffle body 33 and the inner wall of the first tubular section 22 is preferably 10-500,000, 100-400,000, 1,000-300,000, 10,000-200,000, or 100,000-150,000 microns.

With further reference to FIG. 1, the device 10 further includes a second tubular section 24 positioned in generally axial or concentric alignment with said first tubular section 22 as a circumferential jacket surrounding said first section 22 such that a first annular chamber 25 is formed between an outer wall of said first tubular section 22 and an inner wall of said second tubular section 24. The second tubular section 24 has a closed end 26 position with a gap 27 formed from an end of the outlet 23 of said first tubular section 22 and an inner wall of the closed end 26.

In this embodiment, the second tubular section 24 has a plurality of outlet apertures 28 in its side wall downstream from said closed end 26 in the direction of the fluid flow. The second tubular section 24 can include 1, 2, 3, 4, 5, 6 or more outlet apertures 28.

With further reference to FIG. 1, the device 10 further includes a third tubular section 29 positioned in generally axial alignment with said second tubular section 24 as a circumferential jacket surrounding said second section 24 such that a second annular chamber 30 is formed between an outer wall of said second tubular section 24 and an inner wall of said third tubular section 29.

In this embodiment, the third tubular section 29 is closed at one end 31 positioned upstream of the outlet apertures 28 of the second tubular section 24, and an outlet 32 positioned downstream of said closed end 31. The fluid exits the device 10 through the outlet 32.

As discussed with further reference to FIG. 1, the device 10 can include at least one baffle body 33, preferably the shape of a cone, positioned on a stem 34, which is attached to or integral to a disk 35 containing one or more orifices 36.

The at least one baffle body 33 extending into the first tubular section 22 can form an orifice 37 between an exterior surface of the at least one baffle body 33, such as an exterior radial surface, and an inner surface 38 of the wall of the first tubular section 22.

With further reference to FIG. 1, the device 10 can further have a cross-sectional area of the first annular chamber 25 formed between the outer wall of the first tubular section 22 and the inner wall of the second tubular section 24 being at least 0.5, 5, 8, 10, 20, 30, 50, or 60% greater than the cross-sectional area of the first tubular section 22.

With further reference to FIG. 1, the device 10 can further have a cross-sectional area of the second annular chamber 30 formed between the outer wall of said second tubular section 24 and the inner wall of third tubular section 29 being at least 0.5, 5, 8, 10, 20, 30, 50, or 60% greater than the cross-sectional area of the first annular chamber 25 formed between the outer wall of the first tubular section 22 and the inner wall of the second tubular section 24.

With reference to FIG. 2A, in a preferred embodiment, the device for degassing liquids 10 has the outlet apertures 28 of the second tubular section 24 that are radial to the general axis B of the device 10.

With reference to FIG. 2B, in a preferred embodiment, the device for degassing liquids 10 has the outlet apertures 28 of the second tubular section 24 that are tangential to the general axis B of the device 10.

The outlet apertures 28 can have a circular, triangular, square, rectangular, pentagonal, polygonal, or other shape.

The materials used for each component of the device 10 will vary depending on the fluid to be degassed. In one embodiment, the tubular sections 22, 24, and 29 comprise an alloy steel. In another embodiment, the tubular sections 22, 24, and 29 comprise stainless steel alloy.

With reference to FIG. 1, in a preferred embodiment of the method for degassing liquids 10, the gas-saturated or gas-containing liquid flow, moving along the general axis indicated by arrow B, flows into the device for degassing liquids 10 and around the baffle body 33. A pump (not shown) may be configured to pressurize the fluid flowing through the device 10 at flow rate of between about 0.000008-800,000, 0.0008-700,000, 0.08-500,000, 1-350,000, or 10-100,000 $m^3$/hr. One example type of pump may be a centrifugal pump. It will be appreciated that other pump designs may be used.

At the baffle body 33, the liquid flow passes through orifice 37, where the velocity of the liquid flow increases to a minimum velocity (5 m/sec or greater for most fluids) dictated by the physical properties of the liquid. The flow velocity in the orifice 37 is increased while the pressure is decreased resulting in the formation of cavitation cavities or voids in the flow. The liquid flow is passed through the orifice 37 at a sufficient pressure and flow rate to generate a pressure drop across the at least one local constriction of between about 200-200,000, 400-100,000, 500-50,000, or 600-10,000 kPa such that a plurality of cavitation bubbles are formed.

Dissolved or entrained gas in the liquid flow migrates into these vacuum (low pressure) cavitation cavities or voids at the surface boundary between the liquid and cavities and increases the size of the cavitation cavities and the amount of gas within the cavitation cavities.

Upon exit from first tubular section 22 at the outlet 23, the liquid stream contains a mixture of liquid and (uncoalesced) air-gas bubbles or cavitation cavities.

The mixture of liquid and air-gas bubbles from first tubular section 22 turns through the gap 27 into the first annular chamber 25 resulting in a reduced flow velocity of the mixture and the coalescing of bubbles in a low velocity stream as the mixture flows through the first annular chamber 25. The coalescing of bubbles generates fewer bubbles in the liquid and bubbles that have increased size and volume.

The liquid flow, containing coalesced larger gas bubbles, is passed through the plurality of outlet apertures 28 and into the second annular chamber 30 between the second tubular section 24 and the third tubular section 29 resulting in a further reduction in flow velocity of the mixture and further bubble coalescence that reduces the quantity of bubbles in the liquid.

The liquid then exits the second annular chamber 30 through the outlet 32, wherein the bubbles are separated from the liquid flow. According to the invention, the separation generally leaves a liquid flow product that has a concentration of one or more gases or volatilizable contaminants lower than the starting liquid flow.

While the invention has been described with reference to the preferred embodiments, it is understood that various changes can be made and equivalents may be substituted for elements thereof without departing from the scope of the invention.

What is claimed is:

1. A device for degassing a liquid, the device comprising:
    a first tubular section having a single inlet and a single outlet end for passing fluid from the single inlet end to the single outlet end along a longitudinal axis;
    a baffle body positioned on a stem attached to a disk arranged in the single inlet to the first tubular section, the disk comprising an orifice and the baffle body extending into said first tubular section and forming an orifice between the baffle body and an wall inner of the first tubular section, the orifice being configured to generate a first hydrodynamic cavitation field downstream therefrom in the fluid passing into the first tubular section from the single inlet;
    a second tubular section positioned in axial alignment with said first tubular section as a first circumferential jacket surrounding said first tubular section such that a first annular chamber is formed between an outer wall of said first tubular section and an inner wall of said second tubular section;
    said second tubular section having a closed end positioned to form a gap with the single outlet end of said first tubular section, said second tubular section having one or more outlet apertures in a side wall of said second tubular section downstream from said closed end of said second tubular section;
    a third tubular section positioned in axial alignment with said second tubular section as a second circumferential jacket surrounding said second tubular section such that a second annular chamber is formed between an outer wall of said second tubular section and an inner wall of said third tubular section;
    said third tubular section having a closed end after the one or more outlet apertures of said second tubular section, said third tubular section having an outlet positioned downstream of said closed end of said third tubular section.

2. The device for degassing a liquid according to claim 1, wherein the one or more outlet apertures in the side wall of the second tubular section are radial to a general axis of the device.

3. The device for degassing a liquid according to claim 1, wherein the one or more outlet apertures in the side wall of the second tubular section are tangential to a general axis of the device.

4. The device for degassing a liquid according to claim 1, wherein the one or more outlet apertures have a circular, triangular, square, rectangular, pentagonal, or polygonal.

5. The device for degassing a liquid according to claim 1, wherein a cross-sectional area of the first annular chamber is at least 0.5% greater than a cross-sectional area of the first tubular section.

6. The device for degassing a liquid according to claim 1, wherein a cross-sectional area of the second annular chamber is at least 0.5% greater than the cross-sectional area of the first annular chamber.

7. A device for degassing a liquid, the device comprising:
    a first tubular section having a single inlet and a single outlet end;
    a baffle body positioned on a stem attached to a disk arranged in the single inlet to the first tubular section, the disk comprising an orifice and the baffle body extending into said first tubular section and forming an orifice between the baffle body and an wall inner of the first tubular section;
    a second tubular section positioned in axial alignment with said first tubular section such that a first annular chamber is formed between said first tubular section and said second tubular section;
    said second tubular section having a closed end positioned to form a gap with the single outlet end of said first tubular section, said second tubular section having one or more outlet apertures in a side wall of said second tubular section downstream from said closed end of said second tubular section;
    a third tubular section positioned in axial alignment with said second tubular section such that a second annular chamber is formed between said second tubular section and said third tubular section;
    said third tubular section having a closed end adjacent the one or more outlet apertures of said second tubular section, said third tubular section having an outlet positioned downstream of said closed end of said third tubular section.

8. The device for degassing a liquid according to claim 7, wherein the one or more outlet apertures in the side wall of the second tubular section are radial to a general axis of the device.

9. The device for degassing a liquid according to claim 7, wherein the one or more outlet apertures in the side wall of the second tubular section are tangential to a general axis of the device.

10. The device for degassing a liquid according to claim 7, wherein the one or more outlet apertures have a circular, triangular, square, rectangular, pentagonal, or polygonal.

11. The device for degassing a liquid according to claim 7, wherein a cross-sectional area of the first annular chamber is at least 0.5% greater than a cross-sectional area of the first tubular section.

12. The device for degassing a liquid according to claim 7, wherein a cross-sectional area of the second annular chamber is at least 0.5% greater than the cross-sectional area of the first annular chamber.

* * * * *